(12) United States Patent
Joo et al.

(10) Patent No.: US 8,839,108 B2
(45) Date of Patent: Sep. 16, 2014

(54) METHOD AND APPARATUS FOR SELECTING A SECTION OF A MULTIMEDIA FILE WITH A PROGRESS INDICATOR IN A MOBILE DEVICE

(75) Inventors: Jong Sung Joo, Seoul (KR); Mi Ra Seo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 12/984,876

(22) Filed: Jan. 5, 2011

(65) Prior Publication Data
US 2011/0167347 A1 Jul. 7, 2011

(30) Foreign Application Priority Data
Jan. 6, 2010 (KR) ........................ 10-2010-0000798

(51) Int. Cl.
| | | |
|---|---|---|
| G06F 3/00 | (2006.01) | |
| G06F 3/16 | (2006.01) | |
| G09G 5/00 | (2006.01) | |
| G11B 27/10 | (2006.01) | |
| G11B 27/00 | (2006.01) | |
| G11B 27/034 | (2006.01) | |
| G06F 3/0484 | (2013.01) | |

(52) U.S. Cl.
CPC .......... *G06F 3/04847* (2013.01); *G11B 27/105* (2013.01); *G11B 27/007* (2013.01); *G11B 27/034* (2013.01)

USPC .......... 715/716; 715/720; 715/727; 715/723; 345/619; 345/642

(58) Field of Classification Search
CPC G06F 3/04847; G11B 27/105; G11B 27/034; G11B 27/007; G06T 11/60
USPC .......... 715/716, 720, 727, 723; 345/619, 642
See application file for complete search history.

(56) References Cited

U.S. PATENT DOCUMENTS

| | | | |
|---|---|---|---|
| 6,262,724 B1 * | 7/2001 | Crow et al. .................... | 715/723 |
| 6,351,765 B1 * | 2/2002 | Pietropaolo et al. .......... | 709/218 |

(Continued)

FOREIGN PATENT DOCUMENTS

| | | |
|---|---|---|
| CN | 1853407 A | 10/2006 |
| CN | 101611373 A | 12/2009 |

(Continued)

*Primary Examiner* — Boris Pesin
*Assistant Examiner* — Li Sun
(74) *Attorney, Agent, or Firm* — Jefferson IP Law, LLP

(57) ABSTRACT

A method and an apparatus for setting a section of a multimedia file in a mobile device are provided. The apparatus may allow a user to select a section of multimedia file in an intuitive and simple manner. After selecting a multimedia file, the mobile device activates a section selection function of the multimedia file and displays a section selection mark for setting a section. The mobile device then selects the section of the multimedia file by moving the section selection mark along a progress bar indicating a total play time of the selected multimedia file.

18 Claims, 5 Drawing Sheets

(56) References Cited

U.S. PATENT DOCUMENTS

| | | |
|---|---|---|
| 7,890,867 B1 * | 2/2011 | Margulis .................... 715/723 |
| 7,956,847 B2 | 6/2011 | Christie |
| 2005/0045373 A1 * | 3/2005 | Born ........................... 174/254 |
| 2005/0120373 A1 | 6/2005 | Thomas et al. |
| 2005/0152683 A1 | 7/2005 | Ryu |
| 2008/0168382 A1 * | 7/2008 | Louch et al. ................ 715/781 |
| 2009/0116817 A1 * | 5/2009 | Kim et al. ..................... 386/95 |
| 2009/0144623 A1 | 6/2009 | Jung |
| 2009/0228828 A1 * | 9/2009 | Beatty et al. ................ 715/786 |
| 2010/0064239 A1 * | 3/2010 | Crawford et al. ............ 715/771 |
| 2011/0025924 A1 * | 2/2011 | Price et al. ................... 348/734 |
| 2011/0258547 A1 * | 10/2011 | Symons et al. .............. 715/723 |

FOREIGN PATENT DOCUMENTS

| | | |
|---|---|---|
| KR | 10-0357242 B1 | 10/2002 |
| KR | 10-0582956 B1 | 5/2006 |
| KR | 10-0595421 B1 | 7/2006 |
| KR | 10-0879520 B1 | 1/2009 |
| WO | 2005/081250 A1 | 9/2005 |

* cited by examiner

METHOD AND APPARATUS FOR SELECTING A SECTION OF A MULTIMEDIA FILE WITH A PROGRESS INDICATOR IN A MOBILE DEVICE

PRIORITY

This application claims the benefit under 35 U.S.C. §119(a) of a Korean patent application filed on Jan. 6, 2010 in the Korean Intellectual Property Office and assigned Serial No. 10-2010-0000798, the entire disclosure of which is hereby incorporated by reference.

BACKGROUND OF THE INVENTION

1. Field of the Invention

The present invention relates to a mobile device. More particularly, the present invention relates to a method and an apparatus for setting a section of a multimedia file in a mobile device thereby allowing a user to select the section of the multimedia file in an intuitive and simple manner.

2. Description of the Related Art

With rapid technology development, a mobile device is now offering a variety of end-user functions, in addition to a traditional voice call function, such as a Short Message Service (SMS), a digital camera, a music player, a digital broadcast service, an electronic mail (e-mail) service, an instant messenger service, and the like. Additionally, newer mobile devices are also offering a multimedia file playback function by which an audio or video file can be played.

Normally, a multimedia file playback function involves a repeat playback function to repeatedly play a selected playback section. A method for setting such a repeat playback section is, however, annoying as well as very complicated because of having to appoint a start position through a predefined key input, move toward an end position by waiting for the progress of a playback or through several skip inputs, and then appoint the end position through another key input. Furthermore, when modifying the playback section, the method for setting the repeat playback section does not allow selectively modifying one of the start position and the end position and thus requires setting again both positions simultaneously. Therefore, the method may often cause inconvenience to a user.

Therefore, a need exists for a method and an apparatus for setting a section of a multimedia file in a mobile device thereby allowing a user to select the section (e.g., repeat playback section) of multimedia file in an intuitive and simple manner.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for setting a section of a multimedia file in a mobile device thereby allowing a user to select the section of the multimedia file in an intuitive and simple manner.

Another aspect of the present invention is to provide a method and an apparatus for setting a section of a multimedia file in a mobile device thereby allowing a user to conveniently store and open the section.

According to one aspect of the present invention, a method for setting a section of a multimedia file in a mobile device is provided. The method includes selecting a multimedia file, activating a section selection function of the multimedia file, displaying a section selection mark for setting a section, wherein the section selection mark is displayed on a progress bar indicating a total play time of the multimedia file, and selecting a section of the multimedia file by moving the section selection mark along the progress bar.

According to another aspect of the present invention, an apparatus for setting a section of a multimedia file in a mobile device is provided. The apparatus includes a display unit configured to display a section selection mark for setting a section when a section selection function is activated, wherein the section selection mark is displayed on a progress bar indicating a total play time of the multimedia file, and a control unit configured to select a section of the multimedia file depending on a movement of the section selection mark.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
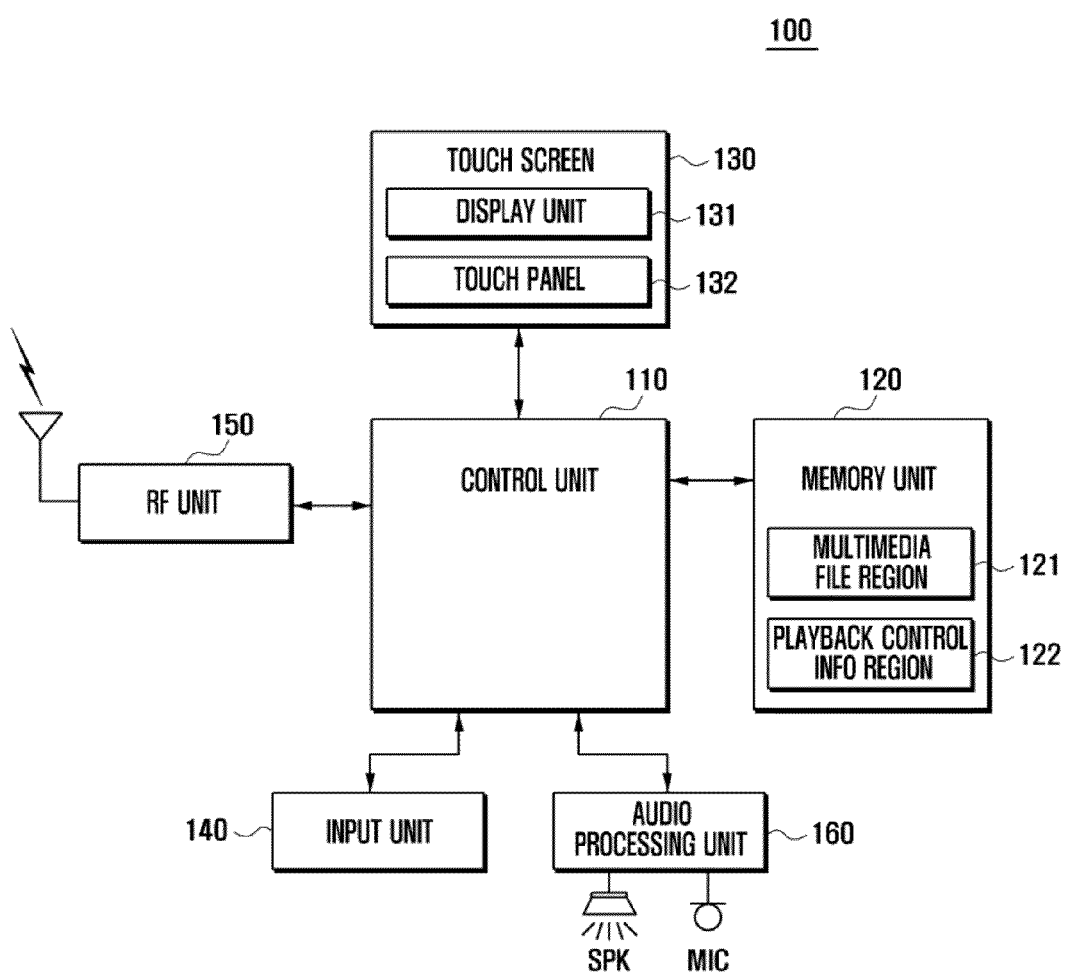
FIG. 1 is a block diagram illustrating a configuration of a mobile device in accordance with an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

Furthermore, well known or widely used techniques, elements, structures, and processes may not be described or illustrated to avoid obscuring the essence of the present invention. Although the drawings represent exemplary embodiments of the present invention, the drawings are not necessarily to scale and certain features may be exaggerated or omitted in order to better illustrate and explain the present invention.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A mobile device according to exemplary embodiments of the present invention may be, but not limited to, a multimedia apparatus capable of playing a multimedia file (e.g., an audio file, a video file, etc.). More specifically, the mobile device may include a Personal Digital Assistant (PDA), a hand-held Personal Computer (PC), a notebook, an MP3 player, a Portable Multimedia Player (PMP), a digital broadcast player, a car navigation system, and the like. More particularly, the mobile device includes a mobile communication terminal having a multimedia file playback function. Exemplary embodiments of the present invention to be described hereinafter employ a mobile communication terminal as a good representative of the mobile device.

FIGS. 1 through 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Prior to a detailed description, the present invention may have a technical feature of selecting a section of a multimedia file through a section selection mark. The present invention may select a section of a multimedia file to repeatedly play the selected section or to edit a multimedia file. Hereinafter, a method and apparatus for setting repeat playback section of a multimedia file will be described by way of example for convenience of explanation.

FIG. 1 is a block diagram illustrating a configuration of a mobile device in accordance with an exemplary embodiment of the present invention.

Referring to FIG. 1, a mobile device 100 includes a control unit 110, a memory unit 120, a touch screen 130, an input unit 140, a Radio Frequency (RF) unit 150, and an audio processing unit 160. The touch screen 130 has a display unit 131 and a touch panel 132. The memory unit 120 has a multimedia file region 121 and a playback control info region 122.

The input unit 140 creates an input signal for entering letters and numerals and an input signal for setting or controlling functions of the mobile device 100, and then delivers them to the control unit 110. The input unit 140 includes a plurality of input keys and function keys to create such input signals. For instance, the input unit 140 may include a dialing key for connecting a voice call, a video call key for connecting a video call, an end call key for disconnecting a voice or video call, a volume key for adjusting an output volume of an audio signal, and an arrow or navigation key. More particularly, the input unit 140 may further include a shortcut key for activating a section selection function (e.g. a repeat playback function). In addition, the input unit 140 may have any special key (e.g., an arrow or navigation key) for moving a section selection mark that appears when the section selection function (e.g. repeat playback function) is activated. For example, a start mark indicating a start position of a section (e.g. repeat playback section) may be set to move depending on a signal of left and right arrow keys, and an end mark indicating an end position of the section may be set to move depending on a signal of up and down arrow keys. The input unit 140 may be formed of one or a combination of a touchpad, the touch screen 130, a keypad having a normal key layout, a keypad having a QWERTY key layout, and the like.

The RF unit 150 may transmit and receive, under the control of the control unit 110, data required for a data communication as well as a voice signal in connection with a call function. The RF unit 150 may include a duplexer, an RF transmitter, and an RF receiver. The RF transmitter (not shown) up-converts the frequency of an outgoing signal received from the control unit 110 and then amplifies the signal. The RF receiver (not shown) amplifies an incoming signal with low-noise and down-converts the frequency of the signal. The duplexer (not shown) isolates the RF receiver from the RF transmitter. Under the control of the control unit 110, the RF unit 150 may download a multimedia file from any external entities, such as a web server or an operator's server. The downloaded multimedia file is stored in the multimedia file region 121 of the memory unit 120.

The audio processing unit 160 sends an audio signal to be outputted to a speaker (SPK) and also sends an audio signal inputted from a microphone (MIC) to the control unit 110. More particularly, the audio processing unit 160 converts an analog audio signal received from the MIC into a digital signal and then outputs it to the control unit 110, and also converts a digital audio signal received from the control unit 110 into an analog signal and then outputs it through the SPK. Additionally, the audio processing unit 160 may output a key input sound stored in the memory unit 120, sound effects related to the execution of a particular function, and an audio signal by a playback of a multimedia file.

The memory unit 120 stores an Operating System (OS) of the mobile device 100, various applications required for optional functions, such as a sound output, an image view, a video display, a broadcast signal output, etc., and related user data. The memory unit 120 may consist of a program region and a data region. The program region stores some programs for the operation of the mobile device 100 and also stores a specific program used for setting a repeat playback according to exemplary embodiments of the present invention. The data region stores a variety of data produced or used while programs are executed. More particularly, the data region includes the multimedia file region 121 that stores at least one multimedia file (e.g., an audio file, a video file, etc.), and the playback control info region 122 that stores playback control information (e.g., volume information, timbre information, total play time information, repeat playback section information, etc.) about the stored multimedia file. Meanwhile, the multimedia file region 121 may store a multimedia file downloaded from the external entities.

The touch screen 130 includes the display unit 131 that performs a screen output function and the touch panel 132 that performs a touch input function. The display unit 131 represents screen data produced in connection with a function of the mobile device 100, state information about a user's input event, a key manipulation, etc., and setting information about a function of the mobile device 100. For instance, the display unit 131 may display a booting screen, an idle screen, a menu screen, a video call screen, a document edit screen, and the like. More particularly, the display unit 131 may display a multimedia file playback screen and may also display, when a section selection function (e.g. a repeat playback function) is activated, a section selection mark for selecting a section (e.g. a repeat playback section). A description will be given below with reference to FIGS. 3 through 5. The display unit 131 may be formed of a Liquid Crystal Display (LCD), an Organic Light Emitting Diode (OLED), an Active Matrix OLED (AMOLED), or any other equivalent.

The touch panel 132 is placed on the entire part of the display unit 131. When any input event occurs, the touch panel 132 detects a variation in physical quantity (e.g., resistance, capacitance, etc.) and recognizes the occurrence of an input event. The touch panel 132 may then convert the detected variation in physical quantity into a digital signal and send it to the control unit 110. Meanwhile, the touch panel 132 may recognize a multi-touch input.

The control unit 110 performs a function to control the whole operation of the mobile device 100. More particularly, the control unit 110 may control a playback of a selected multimedia file and may also control a setting of a repeat playback for the multimedia file being played. Specifically, the control unit 110 may output a section selection mark to the display unit 131 when a section selection function (e.g. a repeat playback function) is activated after selecting the multimedia file. The section selection mark may include a start mark indicating a start position of a section (e.g. a repeat playback section) and an end mark indicating an end position of the section. By moving the start mark and the end mark along a progress bar, a user can easily select or modify the section. If a repeat playback of the selected section is requested, the control unit 110 may repeatedly play the selected section until a signal for releasing a repeat playback function is inputted. More particularly, when a prearranged play signal input event occurs or when a touch release event for the section selection mark occurs after the mark is moved through a touch and drag, the control unit 110 may play the selected section. In addition, the control unit 110 may store the selected section (e.g. repeat playback section) in the memory unit 120 and may also invoke the stored section (e.g. stored repeat playback section).

Although not illustrated, the mobile device 100 may essentially or selectively include any other elements, such as a camera module, a short range communication module, a location based service module, a broadcast receiving module, an Internet access module, and the like. According to the trend for convergence in digital devices, such elements may be varied, modified and improved in various ways, and any other elements equivalent to the above elements may be additionally or alternatively equipped in the mobile device 100. Meanwhile, as will be understood by those skilled in the art, some of the above-mentioned elements in the mobile device 100 may be omitted or replaced with another.

Figure 2:
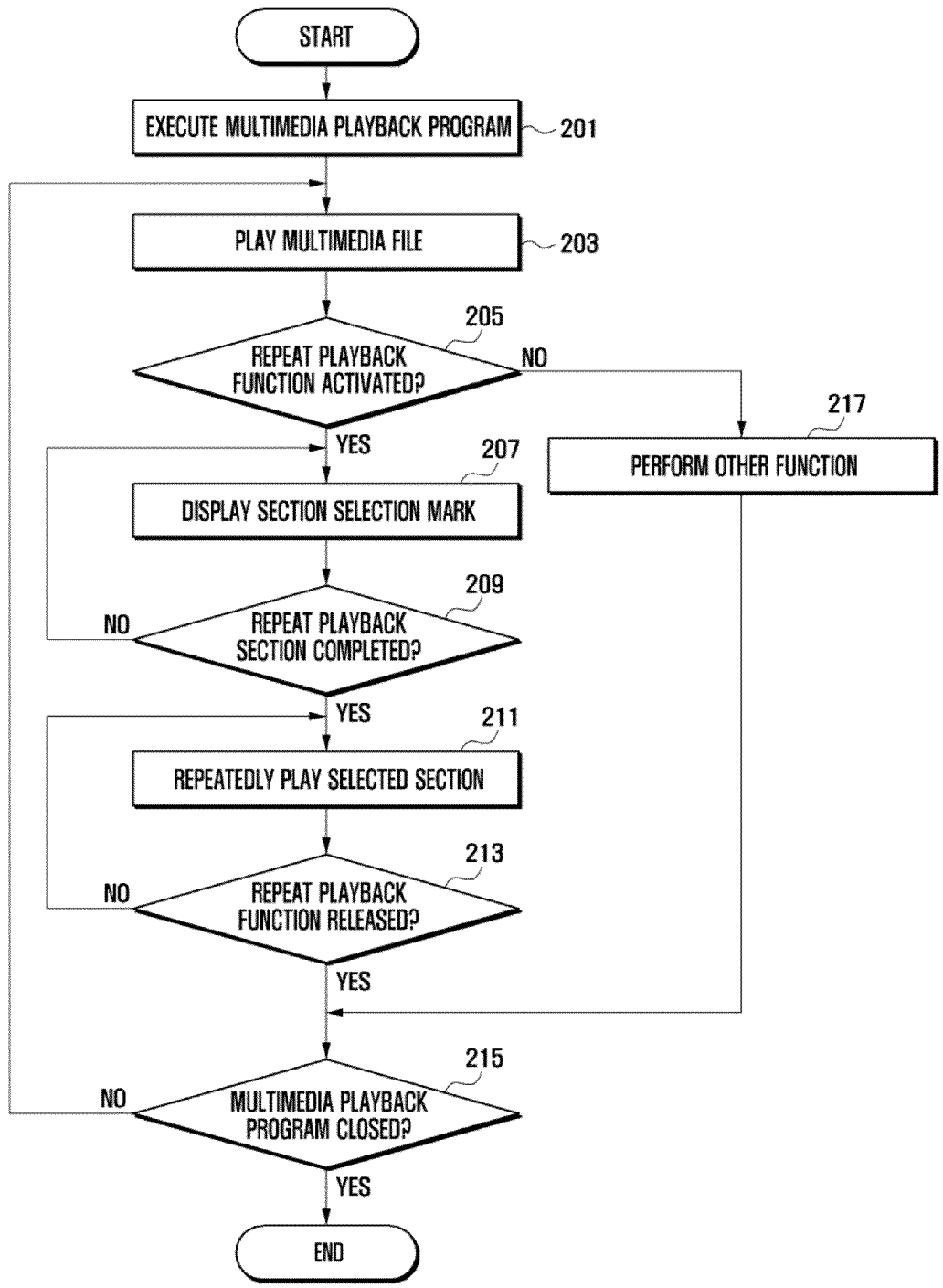
FIG. 2 is a flowchart illustrating a method for setting a repeat playback in a mobile device in accordance with an exemplary embodiment of the present invention.

FIG. 2 is a flowchart illustrating a method for setting a repeat playback in a mobile device in accordance with an exemplary embodiment of the present invention.

Referring to FIGS. 1 and 2, the control unit 110 may detect the execution of a multimedia file playback program in step 201. In this case, the multimedia file playback program refers to a specific application for playing a multimedia file (e.g., an audio file, a video file, etc.). When the multimedia file playback program is executed, the display unit 131 may display a user interface (i.e., a multimedia file playback screen) suitable for a playback of a multimedia file. The multimedia file playback screen may contain a progress bar, indicating a current playback position and a total play time of a selected multimedia file, and an option menu (i.e., repeat playback, next in play list, previous in playlist, pause, play mode change, open, save, etc.) of the multimedia file playback program. A further description regarding the multimedia file playback screen will be given below with reference to FIGS. 3 through 5.

In step 203, the control unit 110 may play a selected multimedia file at a user's request. Then in step 205, the control unit 110 may determine whether a repeat playback function is activated. If it is determined in step 205 that the repeat playback function is not activated, the control unit 110 may perform other requested or prearranged function in step 217. For instance, the control unit 110 may increase a play speed, play the next multimedia file in a list, or perform other function in response to a selection of a corresponding menu item.

In contrast, if it is determined in step 205 that the repeat playback function is activated, the control unit 110 may output a section selection mark used for selecting a repeat playback section in step 207. The section selection mark may include a start mark indicating a start position of a repeat playback section and an end mark indicating an end position of the section. By using the section selection mark, a user can easily select the repeat playback section. For instance, in a case where the mobile device 100 has the touch screen 130, a user may appoint the start position and the end position by touching the section selection mark (i.e., the start mark and the end mark) and then move it along a progress bar.

In step 209, the control unit 110 may determine whether a selection of the repeat playback section is completed. In this step, if a touch release event for the section selection mark occurs, the control unit 110 may determine that the repeat playback section is completely selected. Alternatively, if a play soft key input event for requesting a repeat playback of the selected section occurs, the control unit 110 may determine that the repeat playback section is completely selected.

If it is determined in step 209 that a selection of the repeat playback section is not completed, the control unit 110 may return back to step 207. In contrast, if it is determined in step 209 that a selection of the repeat playback section is completed, the control unit 110 may repeatedly play the selected section in step 211. Then in step 213, the control unit 110 may determine whether a signal for releasing the repeat playback function is inputted. If it is determined in step 213 that no release signal of the repeat playback function is inputted, the control unit 110 may return to step 211. In contrast, if it is determined in step 213 that the release signal of the repeat playback function is inputted, the control unit 110 may further determine whether a signal for closing the multimedia file playback program is inputted in step 215. If it is determined in step 215 that no close signal is inputted, the control unit 110 may return back to step 203. In contrast, if it is determined in step 215 that the close signal is inputted, the control unit 110 may close the multimedia file playback program.

Meanwhile, although not illustrated in FIG. 2, the above-discussed method may further include a step of saving the selected repeat playback section and a step of invoking the stored repeat playback section.

A process of setting a repeat playback in a mobile device 100 is described below with reference to FIGS. 3 through 5. The following examples will employ a case of touch-based selection of a repeat playback section. However, it is possible to select the repeat playback section through a pointing device, such as arrow keys, jog keys, a mouse, etc. For example, a user can select and move the start mark or the end mark by using arrow keys or jog keys. In addition, in a case of a notebook, etc. having a mouse, a user can move the start mark or the end mark by clicking it.

Figure 3:
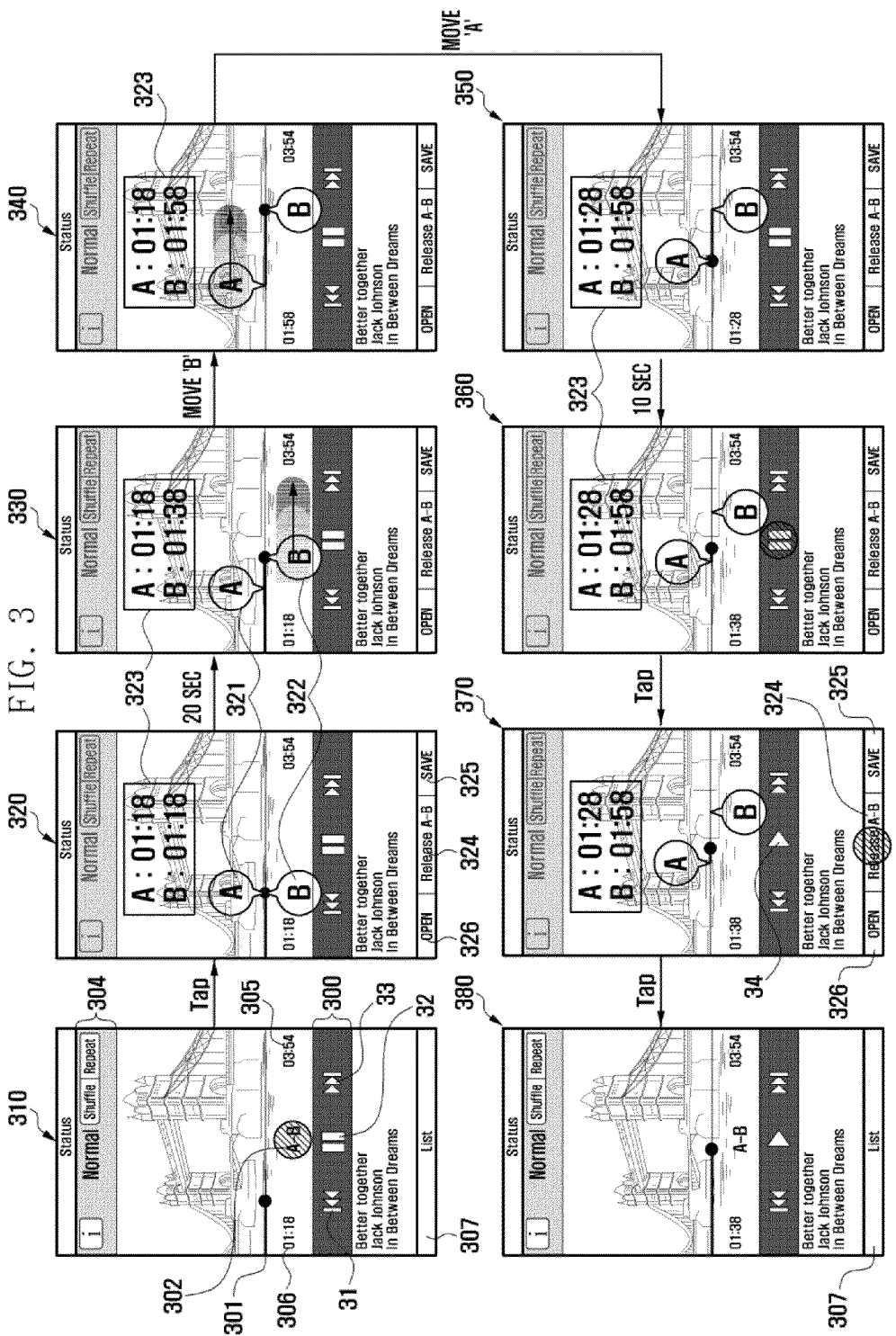
FIG. 3 is a view illustrating a process of setting a repeat playback in accordance with an exemplary embodiment of the present invention.

FIG. 3 is a view illustrating a process of setting a repeat playback in accordance with an exemplary embodiment of the present invention.

Referring to FIG. 3, when a user requests a playback of a selected multimedia file, the control unit 110 may output a multimedia file playback screen to the display unit 131, as shown in an example view 310. The multimedia file playback screen may be displayed in full screen, as shown in example view 310, or alternatively displayed in the form of a pop-up window.

In the example view 310, a reference number 301 indicates a progress bar that tells a total play time 305 and a current play time 306 of a selected multimedia file. The progress bar 301 may use the size of a filled or colored portion to show the total amount of progress. Alternatively, the progress bar 301 may use motion or some other indicator to show that progress is taking place. A reference number 302 indicates a repeat soft key used for activating the repeat playback function. A reference number 300 indicates a menu key region that contains a previous soft key 31, a pause soft key 32 and a next soft key 33. A reference number 304 indicates a play mode soft key region used for selecting a play mode of a multimedia file in a list. Selectable play modes are a normal play mode in which files are played in order, a shuffle play mode in which files are played at random, and a repeat play mode in which a selected file is played repeatedly. A reference number 307 indicates a list soft key used for invoking a playback list of multimedia files. In addition, capitals 'A' and 'B' indicate the start mark and the end mark, respectively.

When a user touches (e.g., a tapping motion) the repeat soft key 302 in a state of the example view 310, the control unit 110 may receive an input signal of the repeat soft key 302 from the touch panel 132. Thereafter, in response to the received input signal, the control unit 110 may output the section selection mark 321 and 322 as shown in an example view 320. A reference number 321 indicates a start mark representing a start position of a repeat playback section, and a reference number 322 indicates an end mark representing an end position of the section. The control unit 110 may locate both the start mark 321 and the end mark 322 at a current play position (e.g., 01:18, as shown, that stands for 1 minute 18 seconds). In addition, the control unit 110 may place the start mark 321 above the progress bar 301 and place the end mark 322 under the progress bar 301. However, both marks 321 and 322 may be placed in the same upper or lower positions. Meanwhile, the control unit 110 may further output a time display box 323 that includes respective times of the start mark 321 and the end mark 322. Additionally, when the repeat playback function is activated, the control unit 110 may change the list soft key 307 to a release soft key 324 used for releasing the repeat playback function, a save soft key 325 used for saving the selected repeat playback section, and an open soft key 326 used for invoking stored information about a repeat playback section. Furthermore, the control unit 110 may deactivate the play mode soft key region 304 and may also remove the repeat soft key 320 from the screen or change its function to perform a release function.

If no event is inputted in a state of the example view 320, the start mark 321 may be fixed to a specific time "01:18" when the repeat playback function is activated, and the end mark 322 may move along the progress bar 301 according to the progress of the playback function. As shown in an example view 330, if there is no event for twenty seconds in a state of the example view 320, the start mark 321 may still stay at a position "01:18" and the end mark 322 may move to position "01:38". Thereafter, if a user touches the pause soft key 32, the control unit 110 may stop a playback of a multimedia file and a movement of the end mark 322. In this case, the pause soft key 32 may be changed to a play soft key 34. If a touch event occurs on the play soft key 34, the control unit 110 may perform a repeat playback in a selected section ranging from "01:18", which is where the start mark 321 is located, to "01:38", which is where the end mark 322 is located.

In states of the example views 320 and 330, a user may easily select a repeat playback section by moving the start mark 321 and the end mark 322 to desired respective positions. For instance, in a state of the example view 330, a user may drag the end mark 322 to a desired position "01:58". At this time, the audio processing unit 160 may output a prearranged sound (e.g., a quick search sound) through the SPK, and the time display box 323 may output a modified time of the end mark 322. Thereafter, when receiving a touch release event from the end mark 322, the control unit 110 may repeatedly play a selected section from the start mark 321 to the end mark 322. In the above example, the control unit 110 may control a repeat playback of a section appointed from "01:18" to "01:58" until a repeat release signal is inputted.

Additionally, in a state of the example view 340, a user may modify the selected repeat playback section by moving the start mark 321. For instance, as shown in the example views 340 and 350, a user may touch the start mark 321 and then move it to a desired position "01:28". At this time, the audio processing unit 160 may output a prearranged sound through the SPK, and the time display box 323 may output a modified time of the start mark 321. Thereafter, when receiving a touch release event from the start mark 321, the control unit 110 may control a repeat playback of a section appointed from "01:28" to "01:58".

Furthermore, if the pause soft key 32 is touched during a playback of the selected section, as shown in an example view 360, the control unit 110 may stop a repeat playback. In this case, the pause soft key 32 may be changed to the play soft key 34, as shown in an example view 370. If a user then touches the release soft key 324 in a state of the example view 370, the control unit 110 may release the repeat playback function and then return to the multimedia file playback screen as shown in an example view 380. The control unit 110 may maintain a normal playback of the current multimedia file.

In a state of the example view 380, the display unit 131 may hide the section selection mark 321 and 322 and the time display box 323 under the control of the control unit 110. Additionally, the play mode soft key region 304 may be activated again, and also the list soft key 307 may appear again instead of the release soft key 324, the save soft key 325, and the open soft key 326. Meanwhile, the repeat playback function may be released when the release soft key 324 is touched after a pause as discussed above or alternatively during a repeat playback.

Although not illustrated in FIG. 3, if a touch event occurs on the save soft key 325 after a selection of a repeat playback section, the control unit 100 may save information about the selected repeat playback section in the memory unit 120. At this time, the repeat playback section may be mapped to a current multimedia file in the memory unit 120. Thereafter, when the multimedia file is removed from the memory unit 120, the repeat playback section mapped thereto may be removed together. Alternatively, when removing the multimedia file, the control unit 110 may output a pop-up window that inquires whether to remove information about the mapped repeat playback section. On the other hand, if a touch event occurs on the open soft key 326, the control unit 110 may invoke stored information about the repeat playback section from the memory unit 120 and then output it to the display unit 131.

Additionally, it is not always required to separately touch the start mark 321 and the end mark 322 to select a desired repeat playback section. In some exemplary embodiments of the present invention, the start mark 321 and the end mark 322 may simultaneously move through a multi touch.

Figure 4:
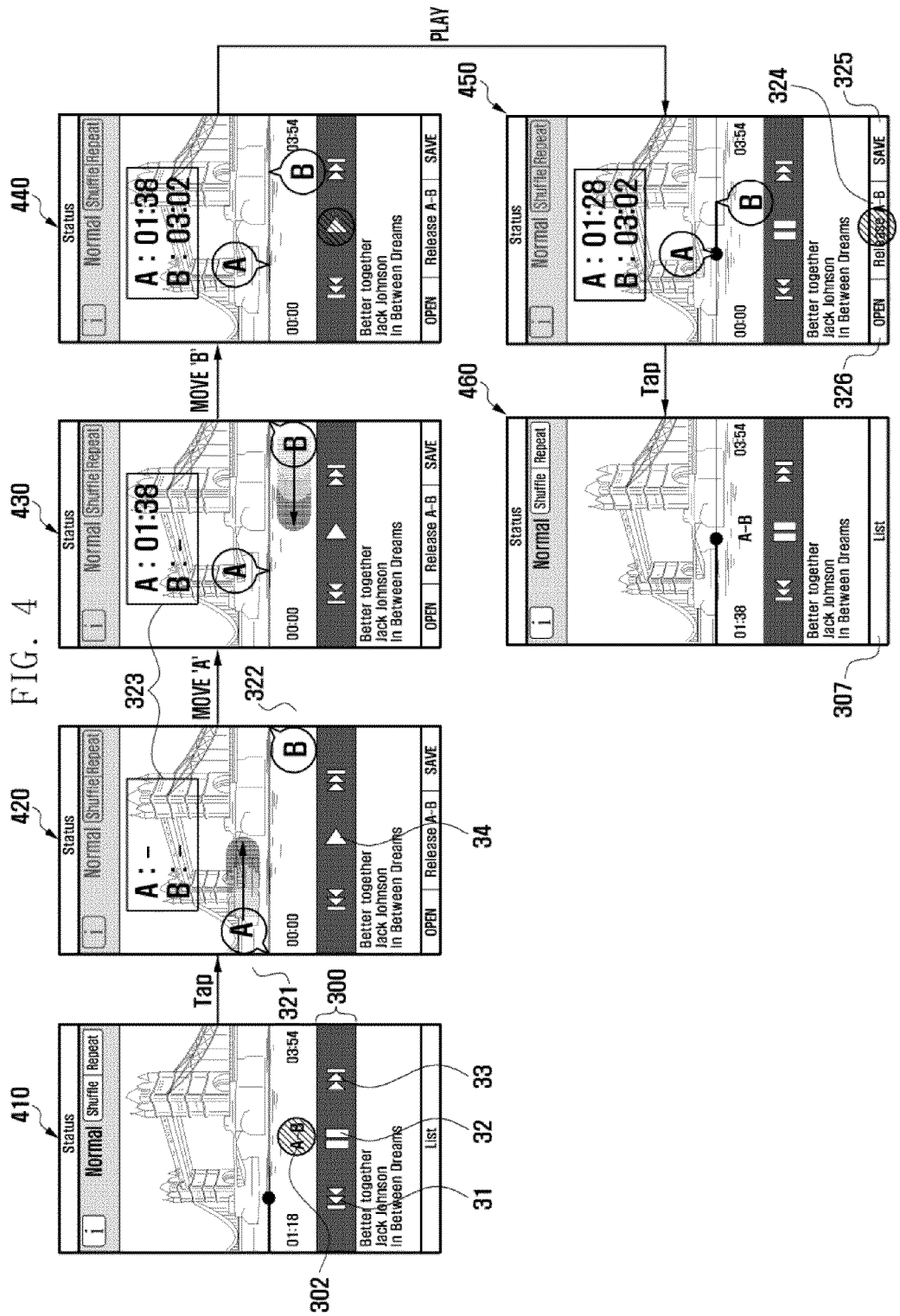
FIG. 4 is a view illustrating a process of setting a repeat playback in accordance with another exemplary embodiment of the present invention.

FIG. 4 is a view illustrating a process of setting a repeat playback in accordance with an exemplary embodiment of the present invention.

Referring to FIG. 4, when a user requests a playback of a selected multimedia file, the control unit 110 may output a multimedia file playback screen to the display unit 131, as shown in an example view 410. At this time, the previous soft key 31, the pause soft key 32, and the next soft key 33 may be outputted in the menu key region 300.

Additionally, when a touch event occurs on the repeat soft key 302 in a state of the example view 410, the control unit 110 may stop a playback of the selected multimedia file. Additionally, as shown in an example view 420, the control unit 110 may output the start mark 321 at the one end (i.e., a play start position of the multimedia file) of the progress bar 301 and may also output the end mark 322 at the other end (i.e., a play end position). Accordingly, as a playback of the multimedia file is stopped, the pause soft key 32 may be changed to the play soft key 34. The time display box 323 may output only capitals A and B without displaying any time information. Alternatively, the time display box 323 may output "00:00" corresponding to the start mark 321 and may also output a total play time "03:54" corresponding to the end mark 322.

Furthermore, in order to appoint the start position of a repeat playback section, a user may touch and drag the start mark 321 in a state of the example view 420. For instance, as shown in an example view 430, a user may drag the start mark 321 to a desired position "01:38". At this time, the time display box 323 may output time information "01:38" about "A" in order to indicate the start position of a repeat playback, while outputting no time information about "B".

In a state of the example view 430, a user may touch and drag the end mark 322 in order to appoint the end position of the repeat playback section. When the end mark 322 moves toward the start mark 321, the control unit 110 may not allow the end mark 322 to go beyond the start mark 321. For instance, as shown in an example view 440, a user may drag the end mark 322 to a desired position "03:02". At this time, the time display box 323 may further output time information "03:02" about "B" in order to indicate the end position of a repeat playback. Meanwhile, in case where the mobile device 100 supports a reverse playback function, the end mark 322 may go beyond the start mark 321 and then be located at the left of the start mark 321. In this case, the control unit 110 may play the selected section in a reverse direction.

When a selection of the repeat playback section is completed, a user may touch the play soft key 34 for a repeat playback of the selected section, as shown in the example view 440. Then the control unit 110 may receive a touch event on the play soft key 34 and may control a repeat playback of the section ranging from "01:38" to "03:02". If the release soft key 324 is touched during a repeat playback as shown in an example view 450, the control unit 110 may stop a repeat playback and then return to the multimedia file playback screen, as shown in an example view 460. In this case, the control unit 110 may maintain a normal playback of the current multimedia file.

Meanwhile, contrary to the above-discussion, the end position may be appointed earlier than the start position. In addition, when the repeat playback function is activated, a playback of a multimedia file is not always stopped. Without stopping a playback of a multimedia file as discussed in the previous exemplary embodiment of the present invention, the section selection mark 321 and 322 may be outputted at the beginning and end positions of the progress bar 301.

Figure 5:
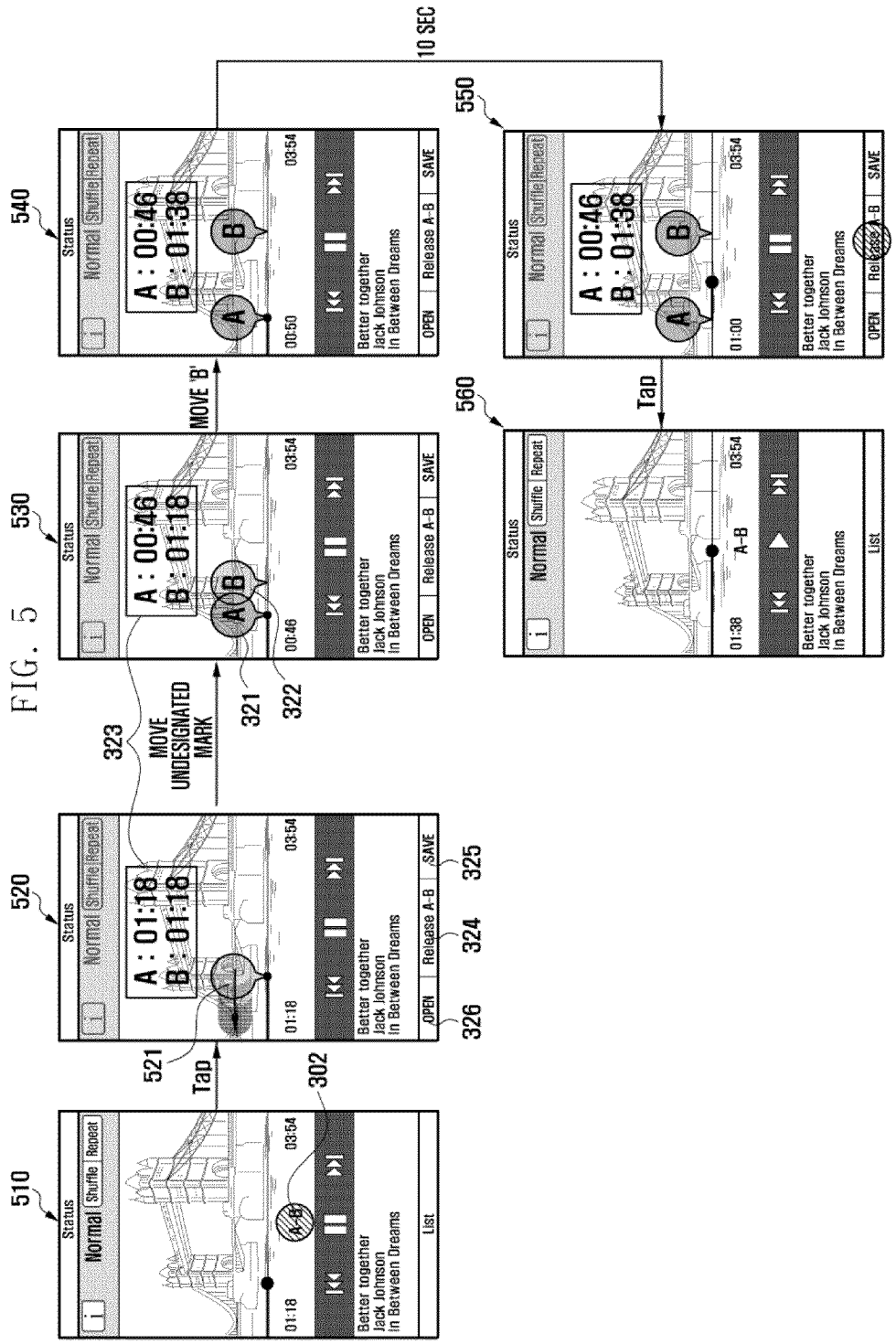
FIG. 5 is a view illustrating a process of setting a repeat playback in accordance with still another exemplary embodiment of the present invention.

FIG. 5 is a view illustrating a process of setting a repeat playback in accordance with an exemplary embodiment of the present invention.

Referring to FIG. 5, when a user requests a playback of a selected multimedia file, the control unit 110 may output a multimedia file playback screen to the display unit 131, as shown in an example view 510. If a touch event occurs on the repeat soft key 302, the control unit 110 may output an undesignated mark 521 with no information about the start mark and the end mark to a current play position, as shown in an example view 520. Until a touch and drag event occurs, the undesignated mark 521 may move according to the progress of a playback of the selected multimedia file, and the time display box 323 may output time information corresponding to the current play position for "A" and "B".

In a state of the example view 520, a user may drag the undesignated mark 521 along the progress bar 301 (i.e., in a forward or backward direction). For instance, if a user drags the undesignated mark 521 in a backward direction (i.e., in a reverse play direction of the multimedia file), as shown in the example view 520, the control unit 110 may output the start mark 321 at a touch release point after drag and output the end mark 322 at the play position before drag. More particularly, as shown in an example view 530, the control unit 110 may output the start mark 321 at a position "00:46", output the end mark at other position "01:18", and then control a repeat playback of the selected section (00:46~01:18).

Thereafter, in a state of the example view 530, a user may drag the end mark 322 in order to modify the repeat playback section. For instance, as shown in an example view 540, a user may drag the end mark 322 to a desired position "01:38". When a touch release signal of the end mark 322 is received, the control unit 110 may repeatedly play the modified section (00:46~01:38).

An example view 550 shows a state after ten seconds, for example, from the occurrence of a touch release event on the end mark 322 in the example view 540. If a touch event occurs on the release soft key 324 during a repeat playback, the control unit 110 may release the repeat playback function and then output the multimedia file playback screen, as shown in an example view 560.

Meanwhile, if a user drags the undesignated mark 521 in a forward direction (i.e., in a normal play direction of the multimedia file) in a state of the example view 520, the undesignated mark 521 may therefore move forward. In this case, the play time of "A" and "B" in the time display box 323 may be changed depending on the movement of the undesignated mark 521. However, the start mark 321 and the end mark 322 may not be produced.

As discussed above, a method and an apparatus for setting a section of a multimedia file in the mobile device may allow a user to select a section of the multimedia file in an intuitive and simple manner. In addition, this method and apparatus may further allow a user to easily modify and save the selected section or open the stored section.

The above-described method according to exemplary embodiments of the present invention can be executed by computer program instructions. Since these program instructions can be included in any computer, in a special processor or in programmable or dedicated hardware, instructions executed therein may create means for implementing functions discussed above. As would be understood in the art, the computer, the processor or the programmable hardware include memory components that may store or receive software or computer code that when accessed and executed by the computer, processor or hardware implement the processing methods described herein. In addition, it would be recognized that when a computer accesses code for implementing the processing shown herein, the execution of the code transforms the computer into a computer designated for executing the processing shown herein. The program instructions and the media may be those specially designed and constructed for the purposes of the present invention, or they may be of the kind well-known and available to those skilled in the art of computer software arts.

While this invention has been particularly shown and described with reference to an exemplary embodiment thereof, it will be understood by those skilled in the art that various changes in form and details may be made therein without departing from the spirit and scope of the invention as defined by the appended claims and their equivalents. For example, the present invention applies to an edition of a multimedia file for selecting a section and cutting the selected section.

What is claimed is:

1. A method for setting a section of a multimedia file in a mobile device, the method comprising:
   selecting a multimedia file;
   playing the selected multimedia file;
   activating a section selection function of the multimedia file while the selected multimedia file is playing, where the playing of the multimedia file continues when the section selection function is activated;
   displaying a section selection mark for selecting a section, wherein the section selection mark is displayed at a position on a progress bar indicating a total play time of the multimedia file; and
   selecting a section of the multimedia file according to a position of the section selection mark along the progress bar,
   wherein the displaying of the section selection mark includes:
      initially displaying, at a current play position in response to the activation of the section selection function, a start mark indicating a start position of the section and an end mark indicating an end position of the section;
      fixing the start mark at the play position corresponding to the current play position when the section selection function is activated unless a touch and drag event occurs on the start mark;
      updating the current play position along the progress bar according to the playing of the multimedia file;
      moving the end mark according to the updated current play position of the multimedia file until an end mark selection event occurs; and
      outputting a time display box that represents time information corresponding to a position of the start mark and a position of the end mark.

2. The method of claim 1, further comprising at least one of:
   saving the selected section of the multimedia file;
   repeatedly playing the selected section until a signal for releasing the repeat playback is input; and
   invoking the saved section, according to a user input.

3. The method of claim 1, wherein the end mark selection event comprises stopping the playing of the multimedia file.

4. The method of claim 2, wherein the repeatedly playing of the selected section includes at least one of:
   playing the selected section when a touch release event occurs after the section selection mark is touched, dragged, and released; and
   playing the selected section when a predefined play signal is inputted after selecting the section of the multimedia file.

5. The method of claim 1, wherein the selecting of the section includes:
   touching at least one of the start mark and the end mark and then dragging the touched mark along the progress bar.

6. The method of claim 1, wherein the displaying of the section selection mark includes:
   outputting the start mark at one end of the progress bar; and
   outputting the end mark at the other end of the progress bar.

7. The method of claim 1, wherein the displaying of the section selection mark includes:
   outputting an undesignated mark moved according to the playing of the multimedia file until a touch and drag event occurs when the section selection function is activated while the selected multimedia file is playing.

8. The method of claim 7, wherein the selecting of the section includes:
   receiving the touch and drag event of the undesignated mark in a reverse play direction of the multimedia file;
   outputting the start mark at a touch release point after dragging; and
   outputting the end mark at a play position before dragging.

9. The method of claim 7, wherein the selecting of the section includes:
   receiving the touch and drag event of the undesignated mark in a normal play direction of the multimedia file; and
   moving the undesignated mark according to the touch and drag event.

10. The method of claim 1, wherein the start mark and the end mark are positioned adjacent to the progress bar in non-obscuring locations.

11. A non-transitory computer-readable storage medium encoded with instructions that, when executed, cause a device to execute the method of claim 1.

12. An apparatus for setting a section of a multimedia file in a mobile device, the apparatus comprising:
   a display unit configured to display a section selection mark for setting a section when a section selection function is activated while a multimedia file is playing, wherein the section selection mark is initially displayed at a current play position, in response to the activation of the section selection function, on a progress bar indicating a total play time of the multimedia file; and a control unit configured to select a section of the multimedia file depending on a movement of the section selection mark, wherein the section selection mark includes a start mark indicating a start position of the selected section and an end mark indicating an end position of the selected section, wherein the display unit is further configured to output a time display box that represents time information corresponding to a position of the start mark and a position of the end mark, and wherein the control unit is further configure to fix the start mark at a play position corresponding to the current play position when the section selection function is activated unless a touch and drag event occurs on the start mark, to update the current play position along the progress bar according to the playing of the multimedia file, and to move the end mark according to the updated current play position of the multimedia file until an end mark selection event occurs.

13. The apparatus of claim 12, further comprising:
a memory unit configured to store the selected section of the multimedia file.

14. The apparatus of claim 12, wherein the control unit saves the selected section, repeatedly plays the selected section, or invokes the saved section, according to a user input, when a signal indicating a complete selection of the section is inputted.

15. The apparatus of claim 12, further comprising:
a touch panel placed on the entire part of the display unit.

16. The apparatus of claim 15, wherein the touch panel is configured to recognize a multi touch input.

17. The method of claim 12, wherein the start mark and the end mark are positioned adjacent to the progress bar in non-obscuring locations.

18. The apparatus of claim 12, wherein a position on the progress bar of each of the start mark and the end mark in a first or second direction is controlled by hard keys or soft keys.

* * * * *